(12) United States Patent
Tedeschi

(10) Patent No.: US 10,339,321 B2
(45) Date of Patent: Jul. 2, 2019

(54) CYBERSECURITY MATURITY FORECASTING TOOL/DASHBOARD

(71) Applicant: DIGNITY HEALTH, San Francisco, CA (US)

(72) Inventor: Michael Vincent Tedeschi, Phoenix, AZ (US)

(73) Assignee: Dignity Health, San Francisco, CA (US)

( * ) Notice: Subject to any disclaimer, the term of this patent is extended or adjusted under 35 U.S.C. 154(b) by 108 days.

(21) Appl. No.: 15/584,735

(22) Filed: May 2, 2017

(65) Prior Publication Data

US 2018/0322292 A1 Nov. 8, 2018

(51) Int. Cl.
| | | |
|---|---|---|
| G06F 11/00 | (2006.01) | |
| G06F 21/57 | (2013.01) | |
| G06Q 10/06 | (2012.01) | |
| H04L 29/06 | (2006.01) | |
| H04L 12/26 | (2006.01) | |

(52) U.S. Cl.
CPC ....... *G06F 21/577* (2013.01); *G06Q 10/0635* (2013.01); *G06Q 10/06393* (2013.01); *H04L 43/065* (2013.01); *H04L 63/1433* (2013.01); *G06F 2221/034* (2013.01); *G06F 2221/2101* (2013.01); *H04L 63/1458* (2013.01)

(58) Field of Classification Search
CPC ............ G06F 21/577; G06F 2221/034; G06F 2221/2101; H04L 63/1425; H04L 63/08; H04L 63/1433; H04L 43/065; G06Q 10/06393; G06Q 10/0635

USPC .......................................................... 726/25
See application file for complete search history.

(56) References Cited

U.S. PATENT DOCUMENTS

| | | | |
|---|---|---|---|
| 7,113,914 B1 | 9/2006 | Spielmann et al. | |
| 7,260,549 B2 | 8/2007 | Spielmann et al. | |
| 7,505,918 B1 | 3/2009 | Spielmann et al. | |
| 7,603,283 B1 | 10/2009 | Spielmann et al. | |
| 2004/0059611 A1 | 3/2004 | Kananghinis et al. | |
| 2007/0180522 A1 | 8/2007 | Bagnall | |
| 2007/0180525 A1 | 8/2007 | Bagnall | |
| 2009/0030751 A1* | 1/2009 | Barve | G06Q 10/04 705/7.22 |
| 2010/0275263 A1* | 10/2010 | Bennett | G06F 21/577 726/25 |
| 2012/0011077 A1 | 1/2012 | Bhagat | |
| 2012/0203590 A1* | 8/2012 | Deb | G06Q 10/04 705/7.28 |

(Continued)

*Primary Examiner* — Mohammad W Reza
(74) *Attorney, Agent, or Firm* — Quarles & Brady LLP

(57) ABSTRACT

Systems and methods of the present invention provide for executing a first database query selecting a project objective data record storing a forecast maturity score and a forecast date earlier in time than a current date. The forecast maturity score defines a level of compliance with a cybersecurity framework and the forecast date identifies a date by which an organization will achieve the level of compliance. The system executes a remote procedure call to determine whether a system process is performing a project objective defined within the project objective data record, and responsive to a determination that the system process is not performing the project objective, execute a second database query updating the forecast date within the project objective data record.

18 Claims, 7 Drawing Sheets

(56) References Cited

U.S. PATENT DOCUMENTS

2013/0254833 A1* 9/2013 Nicodemus ......... G06F 11/3495
　　　　　　　　　　　　　　　　　　　726/1
2017/0048267 A1　2/2017 Yampolskiy et al.

* cited by examiner

| Maturity Levels | Maturity Score | Summary | Exposure / Vulnerability Description |
|---|---|---|---|
| Optimized | 5 | Highly automated<br><br>Continuous improvement engrained in overall management approach | Very limited expsoure to threat; full controls to protect asset or critical function |
| Managed | 4 | Limited automation<br><br>Management monitors, measures, and takes action | |
| Standardized | 3 | Roles and responsibilities defined<br><br>Standardized procedures and controls exist but deviations most likely are not detected | Limited exposure to threat; near-full controls to protect asset or critical function |
| Implemented | 2 | Processes and controls have been developed but highly reliant on specific individuals<br><br>standardization does not exist | Partially-exposed to threat; partial controls to protect asset or critical function |
| Developing | 1 | Implementation of controls has begun<br><br>Ad hoc approaches | Mostly exposed to threat; minimal controls to protect asset or critical function |
| Evaluating | 0 | Aware of risk but evaluating<br><br>Controls not implemented | Full exposure to threat; no controls to protect asset or critical function |

Vertical axis (left): NIST Maturity Level — None to Very High
Vertical axis (right): Risk Exposure — Low to Extreme

FIG. 3

First Assessment / Audit (Program Inititation)

| FUNCTION | CATEGORY | SCORE |
|---|---|---|
| IDENTIFY (ID) | Asset Management | 0.5 |
| | Business Environment | 0.8 |
| | Governance | 1.6 |
| | Risk Assessment | 1.0 |
| | Risk Management Strategy | 0.5 |
| PROTECT (PR) | Access Control | 0.7 |
| | Awareness and Training | 0.5 |
| | Data Security | 1.0 |
| | Information Protection Processes and Procedures | 2.0 |
| | Maintenance | 2.0 |
| | Protective Technology | 0.8 |
| DETECT (DE) | Anomalies and Events | 1.0 |
| | Security Continuous Monitoring | 0.7 |
| | Detection Process | 1.1 |
| RESPOND (RS) | Response Planning | 0.5 |
| | Communications | 0.4 |
| | Analysis | 1.5 |
| | Mitigation | 0.5 |
| | Improvements | 1.7 |
| RECOVER (RC) | Recovery Planning | 0.6 |
| | Improvements | 1.1 |
| | Communications | 0.9 |

Cybersecurity Score (0-5): 1.0

FIG. 4

Current Maturity Score (As Of Today)
March 20, 2017

| FUNCTION | CATEGORY | SCORE |
|---|---|---|
| IDENTIFY (ID) | Asset Management | 3.0 |
| | Business Environment | 3.0 |
| | Governance | 3.0 |
| | Risk Assessment | 3.0 |
| | Risk Management Strategy | 3.0 |
| PROTECT (PR) | Access Control | 3.0 |
| | Awareness and Training | 3.0 |
| | Data Security | 3.0 |
| | Information Protection Processes and Procedures | 3.0 |
| | Maintenance | 3.0 |
| | Protective Technology | 3.0 |
| DETECT (DE) | Anomalies and Events | 3.0 |
| | Security Continuous Monitoring | 3.0 |
| | Detection Process | 3.0 |
| RESPOND (RS) | Response Planning | 3.0 |
| | Communications | 3.0 |
| | Analysis | 3.0 |
| | Mitigation | 3.0 |
| | Improvements | 3.0 |
| RECOVER (RC) | Recovery Planning | 3.0 |
| | Improvements | 3.0 |
| | Communications | 3.0 |

Cybersecurity Score (0-5): 3.0

FIG. 5

| \multicolumn{3}{c}{Secuirty Maturity Score Forecast (As Of) : 01/01/18} |||
|---|---|---|
| FUNCTION | CATEGORY | SCORE |
| IDENTIFY (ID) | Asset Management | 4.0 |
| | Business Environment | 4.0 |
| | Governance | 4.0 |
| | Risk Assessment | 4.0 |
| | Risk Management Strategy | 4.0 |
| PROTECT (PR) | Access Control | 4.0 |
| | Awareness and Training | 4.0 |
| | Data Security | 4.0 |
| | Information Protection Processes and Procedures | 4.0 |
| | Maintenance | 4.0 |
| | Protective Technology | 4.0 |
| DETECT (DE) | Anomalies and Events | 4.0 |
| | Security Continuous Monitoring | 4.0 |
| | Detection Process | 4.0 |
| RESPOND (RS) | Response Planning | 4.0 |
| | Communications | 4.0 |
| | Analysis | 4.0 |
| | Mitigation | 4.0 |
| | Improvements | 4.0 |
| RECOVER (RC) | Recovery Planning | 4.0 |
| | Improvements | 4.0 |
| | Communications | 4.0 |
| | Cybersecurity Score (0-5): | 4.0 |

FIG. 6

CYBERSECURITY MATURITY FORECASTING TOOL/DASHBOARD

FIELD OF THE INVENTION

This disclosure relates to the field of cybersecurity, and more specifically to analyzing an organization's cybersecurity in order to identify project objectives that must be completed to comply with a cybersecurity framework, and report on initial, current, and future actual and forecast cybersecurity framework levels and/or scores.

SUMMARY OF THE INVENTION

The present invention provides systems and methods comprising one or more server computers communicatively coupled to a network and configured to: execute a first database query selecting a project objective data record storing a forecast maturity score and a forecast date earlier in time than a current date. The forecast maturity score defines a level of compliance with a cybersecurity framework and the forecast date identifies a date by which an organization will achieve the level of compliance. The system executes a remote procedure call to determine whether a system process is performing a project objective defined within the project objective data record, and responsive to a determination that the system process is not performing the project objective, execute a second database query updating the forecast date within the project objective data record.

The above features and advantages of the present invention will be better understood from the following detailed description taken in conjunction with the accompanying drawings.

BRIEF DESCRIPTION OF THE DRAWINGS

FIG. 3 illustrates a maturity matrix demonstrating the maturity levels, scores, and risk exposure within a cybersecurity framework.

FIG. 4 is an example embodiment of a user interface used in a cybersecurity maturity forecasting tool.

FIG. 5 is an example embodiment of a user interface used in a cybersecurity maturity forecasting tool.

FIG. 6 is an example embodiment of a user interface used in a cybersecurity maturity forecasting tool.

DETAILED DESCRIPTION

Figure 1:
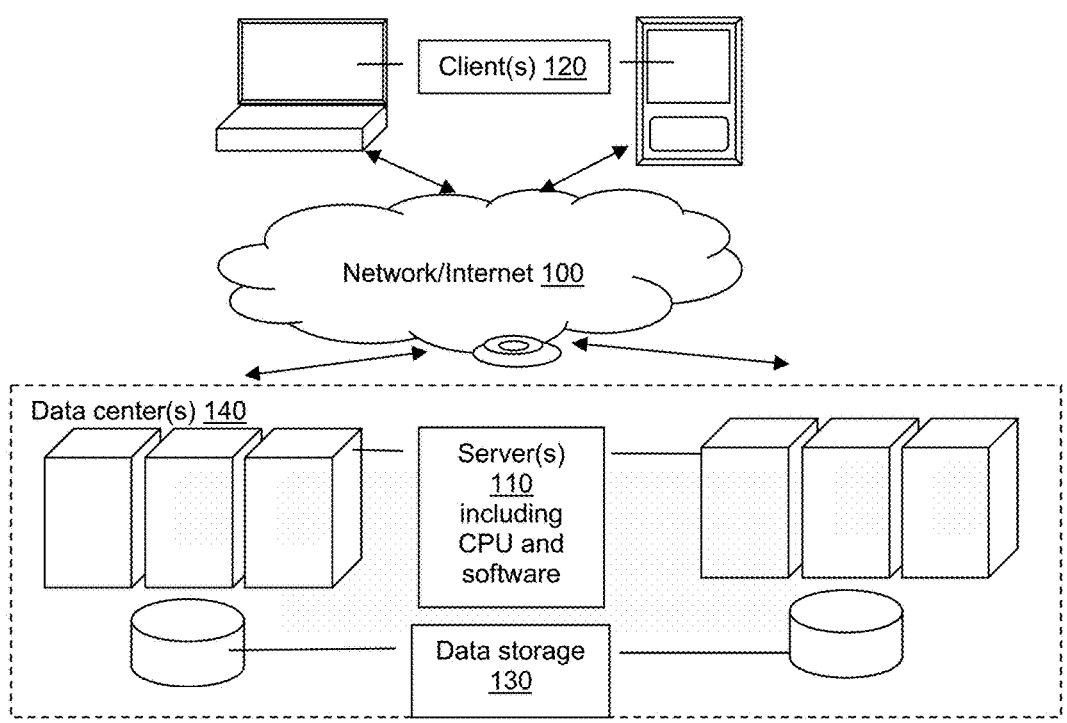
FIG. 1 illustrates a system used for in association with a cybersecurity maturity forecasting tool.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

The IT department is an important part of any modern organization, and it is important that IT departments protect their assets, including data, servers, network infrastructure, or anything else that the IT department uses to bring value to an organization. Thus, cybersecurity information protection against unauthorized disclosure, alteration or modification, disruption, or destruction of systems or data is an important tool in protecting these assets.

The National Institute of Standards and Technology (NIST), a sub department within the Department of Commerce, is responsible for establishing all federal standards regarding technical standards. This organization has over a decade of research and data gathering, which has been compiled into a very large library of information security information. This library includes security controls and recommendation standards for technology.

In 2013, President Barack Obama issued an executive order, declaring the need for a national standard for cybersecurity, thereby requiring a cybersecurity framework to ensure such national standards. In response to this executive order, and using their significant resources, in 2014, NIST undertook the task of establishing a set of security standards around information security and data privacy-related security standards. This set of standards is known as the NIST Cybersecurity Framework.

In anticipation of organizations' perceived complexity of such a framework, NIST drafted a series of documents, separating the cybersecurity framework into various functions for governance, risk management etc. As a non-limiting example, NIST SP (Special Publication) 800-53 is a control document that outlines a set of security standards to be adopted by organizations struggling to implement the standards within the cybersecurity framework. NIST SP 800-53 is incorporated herein in its entirety by reference.

Specifically, NIST SP 800-53 defines a set of functions for implementing the security standards. These categories include Identify, Protect, Detect, Respond, and Recover. Each of these functions include one or more categories, as well as one or more cybersecurity objectives. For example, the Identify (ID) function may include the following categories and respective cybersecurity objectives: 1. Asset Management (ID.AM): The data, personnel, devices, systems, and facilities that enable the organization to achieve business purposes are identified and managed consistent with their relative importance to business objectives and the organization's risk strategy; 2. Business Environment (ID.BE): The organization's mission, objectives, stakeholders, and activities are understood and prioritized; this information is used to inform cybersecurity roles, responsibilities, and risk management decisions; 3. Governance (ID.GV): The policies, procedures, and processes to manage and monitor the organization's regulatory, legal, risk, environmental, and operational requirements are understood and inform the management of cybersecurity risk; 4. Risk Assessment (ID.RA): The organization understands the cybersecurity risk to organizational operations (including mission, functions, image, or reputation), organizational assets, and individuals; and 5. Risk Management Strategy (ID.RM): The organization's priorities, constraints, risk tolerances, and assumptions are established and used to support operational risk decisions.

The Protect (PR) function may include the following categories and respective cybersecurity objectives: 1. Access Control (PR.AC): Access to assets and associated facilities is limited to authorized users, processes, or devices, and to authorized activities and transactions; 2. Awareness and Training (PR.AT): The organization's personnel and partners are provided cybersecurity awareness education and are adequately trained to perform their information security-related duties and responsibilities consistent with related policies, procedures, and agreements; 3. Data Security (PR.DS): Information and records (data) are managed consistent with the organization's risk strategy to protect the confidentiality, integrity, and availability of information; 4. Information Protection Processes and Procedures (RP.IP): Security policies (that address purpose, scope, roles, responsibilities, management commitment, and coordination among organizational entities), processes, and procedures are maintained and used to manage protection of information systems and assets; 5. Maintenance (PR.MA): Maintenance and repairs of industrial control and information system components is performed consistent with policies and procedures; and 6. Protective Technology (PR.PT): Technical security solutions are managed to ensure the security and resilience of systems and assets, consistent with related policies, procedures, and agreements.

The Detect (DE) function may include the following categories and respective cybersecurity objectives: 1. Anomalies and Events (DE.AE): Anomalous activity is detected in a timely manner and the potential impact of events is understood; 2. Security Continuous Monitoring (DE.CM): The information system and assets are monitored at discrete intervals to identify cybersecurity events and verify the effectiveness of protective measures; and 3. Detection Process (DE.DP): Detection processes and procedures are maintained and tested to ensure timely and adequate awareness of anomalous events.

The Respond (RS) function may include the following categories and respective cybersecurity objectives: 1. Response Planning (RS. RP): Response processes and procedures are executed and maintained, to ensure timely response to detected cybersecurity events; 2. Communications (RS.CO): Response activities are coordinated with internal and external stakeholders, as appropriate, to include external support from law enforcement agencies; 3. Analysis (RS.AN): Analysis is conducted to ensure adequate response and support recovery activities; 4. Migration (RS.MI): Activities are performed to prevent expansion of an event, mitigate its effects, and eradicate the incident; and 5. Improvements (RS.IM): Organizational response activities are improved by incorporating lessons learned from current and previous detection/response activities.

The Recover (RC) function may include the following categories and respective cybersecurity objectives: 1. Recovery Planning (RC.RP): Recovery processes and procedures are executed and maintained to ensure timely restoration of systems or assets affected by cybersecurity events; 2. Improvements (RC.IM): Recovery planning and processes are improved by incorporating lessons learned into future activities; and 3. Communications (RC.CO): Restoration activities are coordinated with internal and external parties, such as coordinating centers, Internet Service Providers, owners of attacking systems, victims, other CSIRTs, and vendors.

Each category within the cybersecurity framework is further broken down into one or more subcategories. For example and as described above, the NIST control document (e.g., NIST SP 800-53) defines a category Asset Management (ID.AM). This category may include six subcategories, ID.AM-1-ID.AM-6, the first of which is ID.AM-1: Physical devices and systems within the organization are inventoried.

Each subcategory within the cybersecurity framework is further broken down into one or more assessment objectives, each of which are associated with a subsection reference within the control document. For example, subcategory ID.AM-1 (Physical devices and systems within the organization are inventoried) may include six Control References (NIST SP 800-53 CM-8(a)(1), NIST SP 800-53 CM-8(a)(2), NIST SP 800-53 CM-8(a)(3), NIST SP 800-53 CM-8(a)(4)[1], NIST SP 800-53 CM-8(b)[1], and NIST SP 800-53 CM-8(b)[2]), each of which may be associated with an assessment objective. In this example, the first control reference (NIST SP 800-53 CM-8(a)(1)) is associated with the assessment objective "The organization develops and maintains an inventory of information system components that accurately reflects the current information system."

Given this set of security standards, many organizations have adopted the NIST cybersecurity framework as the de facto framework for protecting their organization against cyberattacks. Nonetheless, some companies have still struggled to implement these standards, and find applications that allow them to process and present the information to interested company parties, such as boards of directors or shareholders.

Thus, users (senior level organization executives (e.g., Chief or Deputy Information Security Officers), IT cybersecurity management or other IT team members, project managers, other administrators, etc.) may be faced with the challenge of organizing, measuring, and reporting the effectiveness of their cybersecurity strategy in the context of the cybersecurity framework in such a way as to demonstrate that the IT department for the organization is moving in the right direction.

For example, stakeholders (e.g., other senior level executives, boards of directors, shareholders, etc.) in the organization's IT department may request a report on the IT department's compliance with the cybersecurity framework at any given point, and how they will respond as the cybersecurity program grows. Currently, an appropriate response to such a request is to hire a third party (e.g., big four accounting firms) to provide an assessment of the organization's current cybersecurity status.

Such assessments typically include a NIST cybersecurity maturity rating reflecting a cybersecurity maturity level (e.g., Evaluating, Developing, Implemented, Standardized, Managed, and Optimized, as described below) and a corresponding cybersecurity maturity score (e.g., 1-5) for the organization. FIG. 3, is a simplified non-limiting example of a cybersecurity maturity matrix.

The maturity levels may reflect the NIST maturity level and risk exposure within the NIST framework. In some embodiments, the maturity levels may be customized by the organization. For example, as seen in FIG. 3, six maturity levels may be included: Evaluating, Developing, Implemented, Standardized, Managed, and Optimized. Each of these maturity levels may be associated with a corresponding maturity score 0-5. For example, an Evaluating maturity level, with a score of 0, represents a maturity level of "None," and each of Developing (maturity score 1), Implemented (maturity score 2), Standardized (maturity score 3), and Managed (maturity score 4), represent a continuum of increasing maturity levels towards an Optimized maturity level with a maturity score of 5, which is associated with a "Very High" maturity level.

By contrast, these security levels may also represent a continuum of risk exposure for the organization. For example, an Optimized maturity level, with a maturity score of 5, may be associated with Low risk exposure, and each of Managed/4, Standardized/3, Implemented/2, Developing/1, represent a continuum of increasing risk exposure towards an Evaluating maturity level, with a maturity score of 0, being associated with an "Extreme" risk exposure. Though not shown in FIG. 3, each maturity level may include a detailed description.

Thus, each maturity level may be associated with maturity level data as follows:

1. Evaluating Maturity Level: Maturity Score: 0; Summary: Aware of risk but evaluating, and/or Controls not implemented; Exposure/Vulnerability Description: Full exposure to threat, no controls to protect asset or critical function; Risk Score: 10; and Detailed Description: General awareness exists for processes and controls but none have been implemented, evaluating the risk (impact/appetite/cost/value/ROI), funding, strategy, and implementation approach.

2. Developing Maturity Level: Maturity Score: 1; Summary: Implementation of controls has begun, Ad hoc approaches; Exposure/Vulnerability Description: Mostly exposed to threat, minimal controls to protect asset or critical function; Risk Score: 8; and Detailed Description: There is evidence that the enterprise has begun implementation of processes and controls, However, no up-to-date compliance policy published and no standardized processes or controls exist, Ad hoc approaches are applied on an individual or case-by-case basis, The overall management of processes and controls is disorganized.

3. Implemented Maturity Level: Maturity Score: 2 Summary: Processes and controls have been developed but highly reliant on specific individuals, standardization does not exist; Exposure/Vulnerability Description: Partially-exposed to threat, partial controls to protect asset or critical function; Risk Score: 6; and Detailed Description: Compliance and Security Policy and Standards are documented and published, Processes and controls have developed to the stage where similar procedures are followed by different people undertaking the same task, There is no formal training or communication of standard procedures or controls, and responsibility is left to the individual, There is a high degree of reliance on the knowledge of individuals and, therefore, errors are likely, Roles and responsibilities are starting to be defined but have not been formalized.

4. Standardized Maturity Level: Maturity Score: 3; Summary: Roles and responsibilities defined, Standardized procedures and controls exist but deviations most likely are not detected; Exposure/Vulnerability Description: Limited exposure to threat; near-full controls to protect asset or critical function; Risk Score: 4; and Detailed Description: Procedures and controls have been standardized and documented, and communicated through training, It is mandated that these processes and controls should be followed, however, it is unlikely that deviations will be detected, The procedures and controls themselves are not sophisticated, but are the formalization of existing practices and standards, Roles and responsibilities have been clearly defined.

5. Managed Maturity Level: Maturity Score: 4; Summary: Limited automation, Management monitors, measures, and takes action; Exposure/Vulnerability Description: Very limited exposure to threat, full controls to protect asset or critical function; Risk Score: 2; Detailed Description: Management monitors and measures compliance with procedures and controls and takes action when not working effectively, Deviations from process and controls are detected and acted upon, Processes and controls are under constant improvement to achieve a level of good practice, Automation and tools are used in a limited or fragmented way.

6. Optimized Maturity Level: Maturity Score: 5; Summary: Highly Automated, Continuous improvement engrained in overall management approach; Exposure/Vulnerability Description: Very limited exposure to threat, full controls to protect asset or critical function; Risk Score: 2; Detailed Description: Processes and controls have been refined to a level of good practice, based on the results of continuous improvement and maturity modelling with other enterprises, IT is used in an integrated way to automate workflow, providing tools, to improve quality and effectiveness, making the enterprise quick to adapt.

Thus, the third party assessment may reflect an overall cybersecurity maturity level and cybersecurity score for the organization. The assessment may be based generally on the organization's compliance with the NIST cybersecurity framework, including various cybersecurity scores and/or cybersecurity maturity levels. However, in the current state of the art, cybersecurity maturity scores may include non-detailed, high-level assessments, and subjective interpretations, which cause inconsistencies between organizations, and even between one assessment and the next.

In addition to these inconsistencies, the current state of the art is also limited to a snapshot of the organization's cybersecurity level or score at a specific point in time, and lacks the ability to dynamically analyze stored data to determine the organization's current overall maturity level or score. Furthermore no existing systems or methods provide means for the organization to determine the organization's cybersecurity maturity level or score at a future date.

The disclosed embodiments improve on the current state of the art by providing a means for organizations to, in addition to displaying the results of the original assessment, display a current state of the organization's cybersecurity compliance. To accomplish this, the disclosed embodiments utilize hardware, software, and/or stored data to calculate and display one or more reports, including the original assessment and the current status of the organization's cybersecurity program.

The disclosed embodiments also utilize data for current completed, ongoing, or planned projects or activities, to determine the status of the program going forward according to any input future date, by responding to user input data (e.g., an input future date) to analyze project software data (e.g., forecast maturity scores) in order to determine and report, via visual display, the projected cybersecurity compliance at any point in time in the future. That is, based on the status of these projects or activities, users are able to determine and demonstrate the status of the organization's cybersecurity program at any time in the future (e.g., in six months, a year, a year and a half, two years, etc.).

Using the provided data, the cybersecurity management team may then demonstrate to interested/concerned parties (e.g., board members, shareholders, etc.) the current status of the program, as well as the progress, based on completed, current, or planned projects, at any date in the future.

It is important to note that although the NIST cybersecurity framework is used as a non-limiting example in the current disclosure, the disclosed embodiments may be used in accordance with any framework designed to improve the cybersecurity of IT departments. Such frameworks may include any combination of levels and scores indicating an organization's cybersecurity maturity, used in conjunction with any combination of project and/or assessment objectives, subcategories, categories, and functions within the framework. The method steps below may be adapted according to the framework used.

Figure 2:
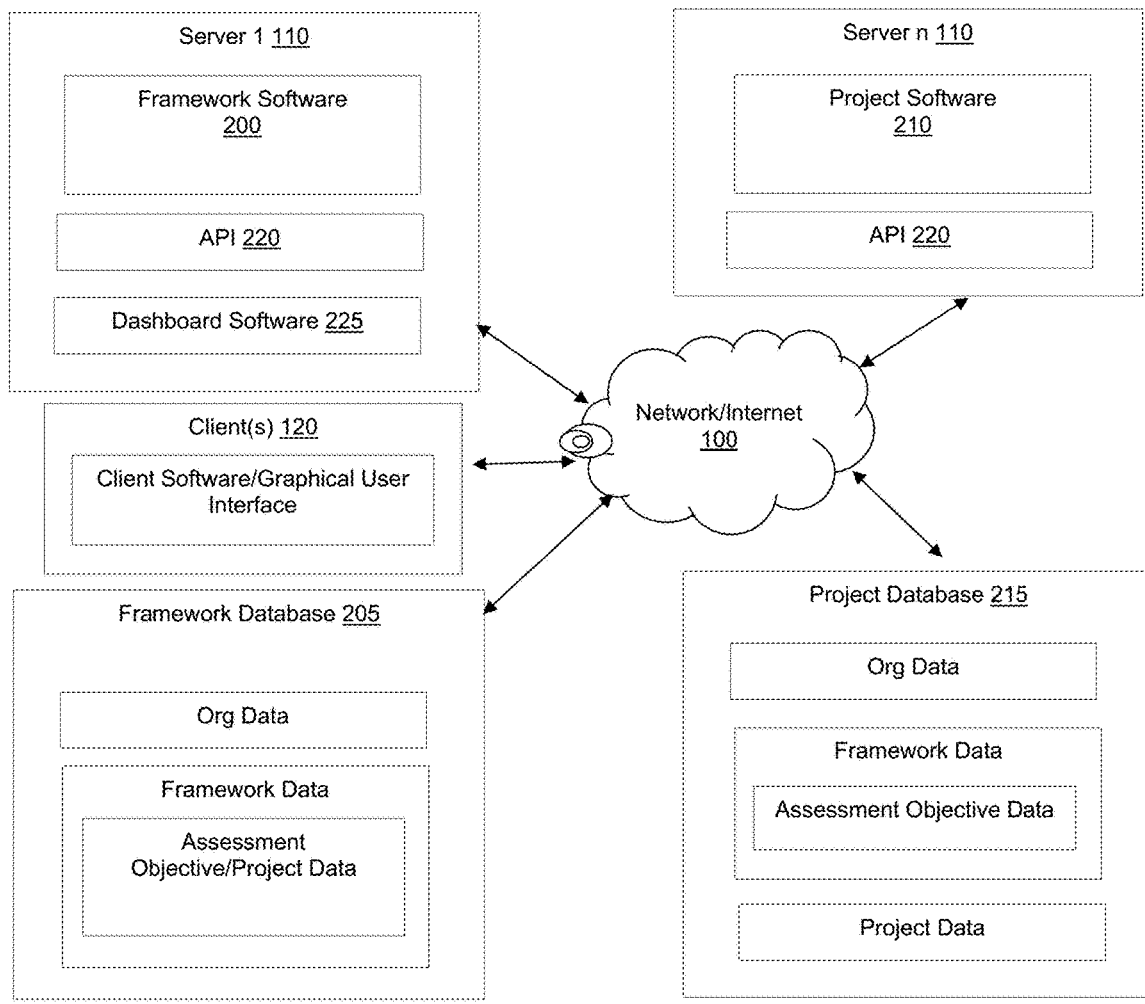
FIG. 2 illustrates a system level block diagram for a cybersecurity maturity forecasting tool.

Turning now to FIGS. 1 and 2, one or more entities may operate one or more server hardware computing devices (servers 110) in one or more data centers 140. Each server 110 may include one or more processors executing specific computer-executable instructions within a memory coupled to each server 110.

The computer-executable instructions may be contained within one or more software modules (e.g., 200, 210, 220, 225). The disclosed embodiments do not limit the hardware computing devices that may run and execute such software and/or the computer-executable instructions within memory. For example, the software instructions may be run and executed on any combination of servers 110, and/or client hardware computing devices (clients 120). It should be understood, therefore, that although the disclosed embodiments refer to instructions and software modules being executed by servers 110, the disclosed method steps may be executed by any combination of servers 110 and clients 120.

The disclosed embodiments may also include one or more data stores 130, and servers 110, clients 120 and data storage 130 may all be coupled via network 100. Data storage 130 may include any combination of databases (e.g., 205, 215), data tables, data records, or data fields storing data associated with the disclosed embodiments. These examples are non-limiting. For example, data storage 130 may be a relational or non-structured database, and/or may include any electronic document capable of storing data for a period of time, such as a spreadsheet, flat file, XML file, etc.

FIG. 2 demonstrates a highly distributed environment, including servers 110, clients 120, and data storage 130, to illustrate individual system components. It should be understood, however, that embodiments may exist in which all software modules (e.g., 200, 210, 220, 225, etc.), databases (e.g., 205, 215, etc.), etc. may be consolidated to operate on a single server 110, or any variation of the single server model and the highly distributed model. Furthermore, databases (e.g., 205, 215) described below may further be consolidated into a single database 130, sharing pertinent data.

For example, in FIG. 2, one or more servers 110 (e.g., Server 1) may operate one or more cybersecurity framework software modules (framework software 200), configured to acquire and store one or more data records defining the cybersecurity framework, including the functions, categories, subcategories, assessment objectives, control references, etc. In this example, server 1, operating framework software 200 may be coupled to a cybersecurity framework data storage (framework database 205), and framework software 200 may be configured to identify, aggregate, and store framework data (e.g., the NIST cybersecurity framework, associated assessment objectives, maturity level and score data and logic, various project data, etc.) within framework database 205.

Returning to FIG. 2, one or more servers 110 (e.g., Server n) may operate one or more project management software modules (project software 210). This project software may be configured to establish, track, update, and assess the original, current, and as described below, future status of each project associated with each of the assessment objectives within the cybersecurity framework. The server 110 operating project software 210 may be coupled to a project management data storage (project database 215), which stores data used to establish, track, update, and assess the original, current, and as described below, future status of each project associated with each of the assessment objectives within the cybersecurity framework.

In the demonstrated highly distributed embodiment of the operating environment, the disclosed software applications and databases may include application integration wherein any combination of framework software 200, framework database 205, project software 210, and project database 215 may be part of an integrated system. In such distributed systems, where each component is hosted on a separate server, for example, the disclosed software modules may include one or more application programming interfaces (API 220) configured to access and share stored data and functions across the system. In these embodiments, the databases may include common data which may be synchronized across distributed databases.

For example, as described below, framework software 200 may receive and store assessment objective or any other framework-related data records. In embodiments where all data is not shared within a common database, framework software 200 may expose an API 220 for each of the assessment objectives or any other framework data within framework database 205. This data may be synchronized/linked so that as the data is updated in framework database 205, it is automatically updated in project database 215 for the project to which the assessment objective is associated.

Thus, as the initial assessment objectives or other framework data is input and stored within framework database 205, framework software 200 may execute an API function call to project software 210 to store and/or update the input framework data (e.g., assessment objectives, subcategories, categories, functions, etc., described herein) within project database 215. Alternatively, project software 210 may execute an API function call to framework software 200 at regular intervals (e.g., hourly, daily, etc.), requesting any updates to the data within framework database 205.

Similarly, as described below, project software 210 may receive and store project update data or any other project-related data records. In embodiments where all data is not shared within a common database, project software 210 may expose an API 220 for each of the project update data or any other project data within project database 215. This data may be synchronized/linked so that as the data is updated in project database 215, it is automatically updated in framework database 205 for the assessment objective to which the project is associated.

Thus, as updated project data or other project data is input and stored within project database 215, project software 210 may execute an API function call to framework software 200 to store and/or update the input project data (e.g., forecast maturity level, forecast maturity score, forecast date, actual maturity level, actual maturity score, and actual date, described below) within framework database 205. Alternatively, framework software 200 may execute an API function call to project software 210 at regular intervals (e.g., hourly, daily, etc.), requesting any updates to the data within project database 215.

Framework software 200, and/or project software 210, may be configured to receive organization profile data for each organization operating framework software 200 and/or project software 210. This profile data may include an organization identifier (org id), authentication information for users operating framework software 200 or project software 210 for the organization, etc.

Framework software 200 may aggregate framework data within framework database 205 using any available means. For example, a user may access a graphical user interface (GUI) rendered by server(s) 110 and displayed by client 120, to manually input or update all of the controls within the cybersecurity framework model. Alternatively, framework software 200 may scan a physical or electronic framework document, and analyze the scanned data to identify each of the assessment objectives within the framework. In other embodiments, framework software 200 may access an application and/or database interface for a database storing the cybersecurity framework, and download, store and/or update the framework data. Framework software 200 may then process the received data and execute a database query inserting the received data into framework database 205.

Each assessment objective identified within the framework document (e.g., NIST framework) may be stored as a separate data record. Each data record may include a data field storing the text of the assessment objective (e.g., "The organization develops and maintains an inventory of information system components that accurately reflects the current information system") and the control reference for that text (e.g., "NIST SP 800-53 CM-8(a)(1)" in the example above). Framework software 200 may continue to store the data from the control document until each assessment objective is stored as a data record within framework database 205.

In the example above, each assessment objective data record may include or be associated in the database with one or more additional data fields, which may be inserted or deleted as needed by the organization. For example, the flow of the NIST cybersecurity framework may require that certain foundational assessment objectives be completed before others. Thus, the control reference data records may include a data field to indicate a priority for the assessment objective. For example, an assessment objective assigned a priority of 1 must be completed prior to an assessment objective assigned a priority of 2, etc.

In another example, each assessment objective data record may include or be associated in the database with a HIPAA compliance data field, possibly a Boolean value, indicating whether the assessment objective requires an organization's compliance with privacy under HIPAA. Various documents and standards may define and cross connect the NIST cybersecurity framework, for example, with all relevant HIPAA technical security control requirements published by appropriate organizations or agencies, and the HIPAA data field may reflect these requirements.

Each assessment objective data record may contain or be joined to a data record and/or data field storing a subcategory associated with the assessment objective. Thus, continuing the example above, the data record storing the NIST assessment objective "The organization develops and maintains an inventory of information system components that accurately reflects the current information system" may include or be joined to a data record or field storing subcategory ID.AM-1: Physical devices and systems within the organization are inventoried.

Each assessment objective data record and/or subcategory data record may contain or be joined to a data record and/or data field storing a category associated with the assessment objective and/or subcategory. Thus, continuing the NIST example above, the data record storing the assessment objective "The organization develops and maintains an inventory of information system components that accurately reflects the current information system," and/or subcategory ID.AM-1 may include or be joined to a data record or field storing category Asset Management (ID.AM): The data, personnel, devices, systems, and facilities that enable the organization to achieve business purposes are identified and managed consistent with their relative importance to business objectives and the organization's risk strategy.

Each assessment objective data record, subcategory data record, and/or category data record may contain or be joined to a data record and/or data field storing a function (e.g., Identify, Protect, Detect, Respond, or Recover) associated with the assessment objective, subcategory, and/or category. Thus, continuing the NIST example above, the data record storing the assessment objective "The organization develops and maintains an inventory of information system components that accurately reflects the current information system," subcategory ID.AM-1, and/or category ID.AM, may include or be joined to a data record or field storing the function Identify.

Framework software 200 may further store each maturity level and its associated score, possibly as one or more data records including the associated maturity level and score data as outlined above (e.g., summary, exposure/vulnerability description, risk score, detailed description, etc.). In some embodiments, framework software 200 may be modified to create additional details around the maturity levels. For example, the maturity levels outlined above include a hybrid of NIST-based maturity levels, and industry standard maturity levels and scores.

Framework software 200 may include logic (possibly stored in framework database 205), creating a color coded "heat map," which associates each maturity level/score with a color. Thus, when displaying the maturity level/score for any element of the framework (e.g., assessment objectives, subcategories, categories, functions), dashboard software 225, or any other software modules in the disclosed embodiments, may display the data in a color-coded manner (e.g., using the associated font or background color) in order to display the maturity level or score for the framework element, thereby providing a quick reference to the maturity levels, how they measure up to the necessary and/or projected maturity and/or existing gaps in the organization's cybersecurity strategy.

That is, Color coding may be used, so that when a user sees red color coding (as opposed to yellow or green, which represent warning or acceptable maturity levels), they know which areas they should focus on in their risk management strategy. In some embodiments, the color coding and current maturity of the organization may be displayed within one or more dynamic GUI controls, such as a dial, bar graph, line graph, etc.

Turning now to FIG. 4, and as noted above, organizations may have third parties assess the initial cybersecurity maturity of the organization's overall system. In some embodiments, the third party may provide a report including a maturity score and/or level for each of the categories, as well as an overall maturity score, based on the assessor's subjective assessment, as seen in FIG. 4. The disclosed software modules may store this data from an initial assessment within data storage 130 in association with the org id for the assessed organization. This assessment data may be used within the software as a set point, meaning it will not change in light of additional project information, and future projections.

In some embodiments, the organization may either not be using a third party assessor, may disagree with the third party assessment, or may not be satisfied with the level of granularity provided by the third party. In these embodiments, the organization may identify each of the assessment objectives within the framework, and perform an internal analysis or audit to determine and assign a maturity level and/or score to each of the identified assessment objectives.

If these assessment objectives are not being addressed as of the date of the assessment, or there is clear evidence that these assessment objectives need to be addressed or should be a higher priority, the organization may assign these assessment objectives a lower maturity level/score than that initially provided by the third party.

The software modules in the disclosed embodiments may store the assessment data within data storage 130, either by user input into a GUI, or through electronic input, as described herein. For example, in embodiments where a third party performs the assessment, a report may be provided as an electronic document. In these embodiments, the data from the report may be imported (e.g., via electronic crawl and data extraction of data within the electronic document). Alternatively, the third party may provide the report in a hard copy form, which may be input into a GUI, scanned as electronic data, etc. The organization may use similar input techniques for aggregating the results of their own internal audits.

The software modules within the disclosed embodiments may then parse the data to identify the assessment objectives, each assessment objective's maturity level and/or score, the date the maturity level/score was identified within the assessment, etc.

Each level and/or score for each assessment objective may be stored within data storage 130 as data records, as described herein, in association with the org id and the date of the assessment. Thus, each assessment objective data record may include assessment data stored within an org id data field, an assessment objective data field, a control reference data field, a maturity level data field, a maturity score data field, and/or an org id data field.

Returning to FIG. 4, the disclosed software modules may present data to reflect the system's overall readiness, based on the organization cybersecurity maturity assessment. Thus, once all data from the assessment is stored within data storage 130 in association with the org id and assessment date, one or more reporting dashboard software modules (dashboard software 225), may generate a report presenting the initial assessment data within a dashboard such as that seen in FIG. 4.

The organization wishing to view the report may be authenticated to the dashboard software 225, possibly using a username and password within the organization profile stored in association with the org id. Once the organization is authenticated, dashboard software 225 may select all data records, including assessment objectives associated in data storage with the authenticated org id, and may select framework data records for each category (possibly executing a remote procedure call to API 220) selecting all categories within the framework associated with each of the assessment objectives, and may group the selected assessment objective data records according to the identified categories.

Dashboard software 225 may then select the maturity score for each identified assessment objective data record, and calculate an average of the maturity scores for all assessment objectives associated in the database with each category. This process may be repeated for each of the categories identified within the framework that are associated with the selected assessment objectives.

The dashboard software 225 may then generate and render a GUI for reporting the results of the initial assessment. First, the dashboard software 225 may select data records for each function (possibly executing a remote procedure call to API 220) selecting all functions within the framework associated with each of the categories, and render a function group label or other indicator (e.g., IDENTIFY (ID), PROTECT (PR), DETECT (DE), RESPOND (RS), RECOVER (RC) in FIG. 4).

For each function group indicator, dashboard software 225 may break out the various functions by category, creating a row for each category score and rendering a background in a heat map color associated with an average maturity score for that category. Dashboard software 225 may then insert the category name and maturity score within that row. This process may be repeated for each function and its associated categories, as seen in FIG. 4. The dashboard software 225 may then transmit the rendered dashboard report to client 120 for display.

The organization may use this aggregated and/or displayed data to identify, from a strategy perspective, weaknesses or other gaps in the organization's cybersecurity. Specifically, the organization may use the initial assessment report to identify projects to address assessment objectives, by category, which are not currently being addressed within the organization.

Based on the generated report, organization executives may determine a desired overall maturity score. The goal of the desired maturity score should be to create a roadmap strategy to improve, increase, and enhance their cybersecurity capabilities. First, the organization may identify a deadline by which they would like to reach an overall maturity score. As a non-limiting example, the organization executives may establish a 3 year timeline by which they would like to have achieved an optimized maturity level for all functions, with an overall high maturity score (e.g., greater than 3.5), and a Risk score of 2 or less (i.e., low risk).

The organization may then assess the maturity scores for each of the identified functions/categories to outline projects and initiatives on which they need to focus. These may be determined by drilling down through each function, category, and subcategory to identify the assessment objectives that received a low maturity level/score in the initial assessment. The organization may then create projects to address the assessment objectives. Each of the projects may be prioritized according to urgency, neglect, and/or the priority data field in the associated assessment objective priority data records.

Specifically, the organization may designate one or more business process owners to define the projects and how each of the assessment objectives are to be accomplished. The business process owners may operationalize the project by meeting with one or more organization executives and/or project managers to determine the details of the project, and layout out a plan defining how the assessment objectives are to be accomplished. Using the information from such meeting, the business process owners may define various standard operating procedures and "run books" that define the details of the project and/or the assessment objectives to be accomplished by each of the projects. The business process owners may then pass the project details along to the project managers and project team members to complete the projects and/or assessment objectives according to the standard operating procedures and/or run books.

As each project is completed, a cascading effect may be achieved, wherein the maturity level and score for each of the assessment objectives improves, thereby improving the maturity levels and scores of each of the subcategories, categories, and functions.

The organization may create project teams for each of the identified assessment objective projects, and each team may assess the assigned project to predict the maturity level and/or maturity score that they believe they will achieve by a predicted date. The teams may further assess the project in the context of the overall target date, in order to establish a timeline defining which projects/assessment objectives are to be completed during each of a series of regular intervals (e.g., weekly, bi-weekly, monthly, bi-monthly, quarterly, annually, etc.). For each project for each of the regular intervals, each team may establish a forecast maturity level, and a forecast maturity score that the team believes will be achieved by the forecast date.

Project software 210 may generate and render a GUI for display on client 120. Organization users and/or project managers may access the GUI, possibly after authentication, and input the project data for the organization's cybersecurity optimization plan described above. Specifically, organization users may, for each of the identified projects, input project data into the GUI, including an associated assessment objective identifier, a forecast maturity level, a forecast maturity score, and a forecast date for each of the regular intervals (e.g., each quarter).

Project software 110 may receive the project data submitted from the GUI and, for each project data submission, insert the related project data into the project database 215. In distributed embodiments, the project software 210 may select data records for each associated assessment objective (possibly executing a remote procedure call to API 220) according to the associated assessment objective identifier, and store the assessment objective in association with the project data within project database 215.

In some embodiments, project software 110 may generate a data record within project database 215 for each project. Each data record may include data fields for an original assessment data defining an original maturity level, original maturity score, and date of the assessment. Similarly, each project data record may include the input forecast maturity level, forecast maturity score, and forecast date for each project for each of the regular intervals (e.g., quarters). Finally, each project data record may include data fields for an actual maturity level, an actual maturity score, and an associated actual date for each of the regular intervals.

In some embodiments, the project software 210 may automatically arrange any input projects according to priority, so that projects with a higher number (i.e., with a lower priority) cannot be input or started until a project with a lower number (i.e., a higher priority) have been completed.

In some embodiments, project software 210 may receive only a desired maturity level/score and target date from the GUI. Using the initial assessment data and the org id, project software 210 may automatically generate projects for each of the assessment objectives according to the data from the initial assessment, the input target maturity level/score and target date.

As projects may be unpredictable, project managers may access a GUI provided through the project software 110 in order to update parameters of the project as progress is made, specifically updating the actual date, the actual maturity level, the actual maturity score, the forecast maturity level, the forecast maturity score, and/or the forecast maturity date. Project software 210 may render the GUI and transmit it to client 120 for display to the users, possibly authenticated project managers. The user may be authenticated, access the GUI, and identify a specific project/assessment objective to be modified. Project software 210 may receive the data to be updated, update that data in the project database 215, calculate an applied adjustment to each of the regular intervals for that project/assessment objective, and update all subsequent data to reflect the modification.

As a non-limiting example, a project manager may input data into the GUI indicating that a project associated with a specific assessment objective was completed a month ahead of the forecast date, and that the forecast maturity level and forecast maturity score have been achieved. After submission, the project software 210 may receive the data and update the data record(s) in the project database 215 to reflect that the actual maturity level and actual maturity score were achieved. The project software 210 may further update the actual date to reflect that this level and score was achieved a month ahead of the forecast date. The project software 210 may then update the forecast date for all regular intervals (e.g., quarters) subsequent to the actual date, thereby speeding up the date by which the next forecast maturity level and forecast maturity score will be achieved.

In another non-limiting example, a project manager may input data into the GUI indicating that a project associated with a specific assessment objective was completed a month later than the forecast date (or has not yet been completed), and that the forecast maturity level and forecast maturity score have not been achieved by the forecast date. The project manager may then enter a new forecast date into the GUI. After submission, the project software 210 may receive the data and update the data record(s) in the project database 215 to reflect the new forecast date. The project software 210 may then update the forecast date for all time periods (e.g., quarters) subsequent to the new forecast date, thereby postponing the date by which the next forecast maturity level and forecast maturity score will be achieved.

In some embodiments, the data input causing the system to update the actual maturity level, the actual maturity score, the actual date, the forecast date, the forecast maturity level, and/or the forecast maturity score for a project/assessment objective may be generated by an automated process in which any combination of the framework software 200 and the project software 210 automatically determine whether each project/assessment objective is completed by its forecast date.

In these embodiments, the framework software 200 and/or the project software 210 may select all of the organization's project/assessment objective data records where 1) the current date is past the forecast date in the data record; and 2) the data record does not store an associated actual date, actual maturity level, and/or actual maturity score associated with the forecast date.

For each of these data records, the software modules may automatically or programmatically audit the system for security weaknesses associated with each selected data record. In these embodiments, the system may provide tools providing the capability, possibly through API 220 calls to various parts of the system, which may provide access to the functionality or data to be analyzed.

For example, multiple project/assessment objective data records imported into framework database 205 may identify projects or assessment objectives to be fulfilled by the organization's information system, to enhance cybersecurity by providing access authorization, providing security safeguards at system boundaries, and maintaining audit records.

The disclosed system may include various API 220 functionality, allowing the project software 210 and/or framework software 200 to determine whether the requirement for the assessment objective has been fulfilled. If not, the disclosed system may generate and display a notification, possibly to the appropriate project manager, that the requirement has not been fulfilled by the forecast date.

In some embodiments, the notified user may be presented with a GUI allowing the user to input an updated forecast date, forecast level, and/or forecast score, and submit the input data to server 110. The project software 210 and/or framework software 200 may apply the updated forecast date to all subsequent forecast dates as described above. In embodiments where no GUI is presented to the user, the software modules may automatically update the forecast date to the next regular interval (e.g., the next quarter).

Applying the model above to the access record example above, NIST SP 800-53 AC-3 requires that the information system enforces approved authorizations for logical access to information and system resources in accordance with applicable access control policies. The software modules may access, possibly via API 220, the systems to determine whether the information system is configured, by the forecast date, to enforce approved authorizations for logical access to information and system resources in accordance with applicable access control policies, and if not, update the forecast date as outlined above.

NIST SP 800-53 AC-4 requires that the information system enforces approved authorizations for the flow of information within the system and between interconnected systems based on organization-defined policies. The software modules may access, possibly via API 220, the systems to determine whether the information system is configured, by the forecast date, to enforce approved authorizations for the flow of information within the system and between interconnected systems based on organization-defined policies, and if not, update the forecast date as outlined above.

Applying the model above to the access record example above, NIST SP 800-53 SC-5 requires that the information system protects against or limits the effects of organization-defined types of denial of service attacks by employing organization-defined security safeguards. The software modules may access, possibly via API 220, the systems to determine whether the information systems protect against or limits the effects of organization-defined types of denial of service attacks by employing organization-defined security safeguards, and if not, update the forecast date as outlined above.

NIST SP 800-53 SC-7(a)-(c) require that information system monitors and controls communications at the external boundary of the system and at key internal boundaries within the system; implements subnetworks for publicly accessible system components that are physically or logically separated from internal organizational networks; and connects to external networks or information systems only through managed interfaces consisting of boundary protection devices arranged in accordance with an organizational security architecture. The software modules may access, possibly via API 220, the systems to determine whether the information system protects the system at system boundaries, and if not, update the forecast date as outlined above.

Applying the model above to the audit record example above, NIST SP 800-53 AU-3 requires that the information system generates audit records containing information that establishes what type of event occurred, when the event occurred, where the event occurred, the source of the event, the outcome of the event, and the identity of any individuals or subjects associated with the event. The software modules may access, possibly via API 220, the systems to determine whether the information system generates such audit records by the forecast date, and if not, update the forecast date as outlined above.

NIST SP 800-53 AU-5(a)-(b) require that the information system alerts specific organization-defined personnel in the event of an audit processing failure; and takes organization-defined actions (e.g., shut down information system, overwrite oldest audit records, stop generating audit records) in the event of such a failure. The software modules may access, possibly via API 220, the systems to determine whether the information system is configured, by the forecast date, to create alerts and take the appropriate actions, and if not, update the forecast date as outlined above.

NIST SP 800-53 AU-7(a)-(b) require that the information system provides an audit reduction and report generation capability that supports on-demand audit review, analysis, and reporting requirements and after-the-fact investigations of security incidents; and does not alter the original content or time ordering of audit records. The software modules may access, possibly via API 220, the systems to determine whether the information system is configured, by the forecast date, to provide such audit reduction and report generation capability without altering the original content or time ordering of the audit records, and if not, update the forecast date as outlined above.

NIST SP 800-53 AU-8(a)-(b) require that the information system uses internal system clocks to generate time stamps for audit records; and records time stamps for audit records that can be mapped to Coordinated Universal Time (UTC) or Greenwich Mean Time (GMT) and meets organization-defined granularity of time measurement. The software modules may access, possibly via API 220, the systems to determine whether the information system is configured, by the forecast date, to generate such time stamps for audit records, and if not, update the forecast date as outlined above.

NIST SP 800-53 AU-9 requires that the information system protects audit information and audit tools from unauthorized access, modification, and deletion. The software modules may access, possibly via API 220, the systems to determine whether the information system is protects the audit information and tools from unauthorized access, modification, and deletion, and if not, update the forecast date as outlined above.

NIST SP 800-53 AU-10 requires that the information system protects against an individual (or process acting on behalf of an individual) falsely denying having performed organization-defined actions to be covered by non-repudiation. The software modules may access, possibly via API 220, the systems to determine whether the information system is protects the audit information and tools from unauthorized access, modification, and deletion, and if not, update the forecast date as outlined above.

NIST SP 800-53 AU-12(a)-(c) requires that the information system provides audit record generation capability for the auditable events defined in AU-2 a. at organization-defined information system components; allows organization-defined personnel to select which auditable events are to be audited by specific components of the information system; and generates audit records for the events defined in AU-2 d. with the content defined in AU-3. The software modules may access, possibly via API 220, the systems to determine whether the information system is protects the audit information and tools from unauthorized access, modification, and deletion, and if not, update the forecast date as outlined above.

This automation of project updates is not limited to projects/assessment objectives defining objectives to be accomplished by the information system. In some embodiments, the disclosed system may analyze objectives directed to the organization (e.g., "the organization deploys/employs the capability to detect security weaknesses in the system"). In these embodiments, project database 215 may include additional objectives that may be automatically audited by the disclosed system.

The system may identify whether the data for these objectives is available through the information system, possibly through API 220 system calls. For example, the organization may determine that the information system has the capability of accessing available data regarding missing software or software update data. If the system determines that such an automated system is in place, the system may determine that the organization supports the identification of software weaknesses. The software modules may access, possibly via API 220, this stream in order to determine whether the software is missing or needs to be updated, and if so, update the forecast date as outlined above.

In some embodiments, the system may include a centralized software (e.g., a server-client architecture, a cloud based technology and/or an API accessible via remote procedure call, etc.) including one or more software modules for implementing the cybersecurity-based assessment, project management, and forecasting tools described above. These software modules may run according to the data stored in an associated cybersecurity database, and the necessary routing and database information may be stored in, and accessible by, an accompanying configuration file. This configuration file may be agnostic, allowing any platform, tool, operating system, etc. to accomplish the procedures defined in the software modules and/or configuration file.

Any client-based software may include a bolt-on or plugin feature allowing the client-based software to access the assessment, project management, and/or forecasting tools described above. As a non-limiting example, a word processor or spreadsheet client application may include a bolt on feature, possibly designed using macros for the word processor or spreadsheet client application, etc., that contains details about a current project. In this example, the project may include software modules for identifying vulnerabilities within the system. For example, the software modules may automatically scan for security updates available for the software running within the organization's systems. If the software updates are not current, the cybersecurity dashboard may be automatically updated to reflect the vulnerabilities, and this data may be pushed out to the additional features running within the word processor or spreadsheet program, informing the user of the scan, and the vulnerabilities, thereby providing constant up to date data for all connected software applications. As another non-limiting example, a browser plugin could accomplish an analogous scan, update, and report.

Turning now to FIGS. 4-6, and as previously noted, the disclosed software modules may present data to reflect the system's overall readiness. Thus, once all data project/assessment objective data is stored within data storage 130 in association with the org id, dashboard software 225 may generate a report presenting the initial assessment score data, current maturity score data, and forecast maturity score data within a dashboard. Thus, in addition to a report of the initial assessment data seen in FIG. 4, the dashboard software may further render and display a current maturity score seen in FIG. 5, and well as a forecast maturity score seen in FIG. 6. This data may be presented in any format, including an executive summary, a line graph, a bar graph, etc., and may be extended to include any data for future regular intervals (e.g., each quarter until the organization is at the desired maturity level).

Turning now to FIG. 5, the disclosed software modules may present data to reflect the system's current readiness. Thus, once all data is input for all projects/assessment objectives, the dashboard software 225 may generate a report presenting the current maturity data within a dashboard such as that seen in FIG. 5.

The organization wishing to determine their current maturity score may be authenticated to the dashboard software 225, possibly using a username and password within the organization profile stored in association with the org id. Once authenticated, in order to determine the organization's current maturity score, dashboard software 225 may identify a current date (e.g., using a software function such as Now( )), and execute a database query (possibly executing a remote procedure call to API 220) selecting all data records associated with the org id and including the data for current projects and/or assessment objectives.

Dashboard software 225 may then select data records for each category (possibly executing a remote procedure call to API 220) selecting all categories within the framework associated with each of the assessment objectives. Dashboard software 225 may then group each of the selected data records according to the category associated with the assessment objective in the data record.

Dashboard software 225 may then identify, within each project/assessment objective data record, a data field including the actual date closest in time to the current date. If the data field is null, and/or stores no data in association with that actual date, dashboard software 225 may identify the most recent actual date, prior to the current date, which contains data. Using the actual date closest to the current date that contains data, dashboard software 225 may select the actual maturity score associated in the database with the identified actual date.

Dashboard software 225 may then use the identified actual maturity score identified within each project/assessment objective data record to calculate an average of the maturity scores for all projects/assessment objectives associated in the database with the identified category. This process may be repeated for each of the categories identified within the framework that are associated with the selected projects/assessment objectives.

The dashboard software 225 may then generate and render a GUI for reporting the results of the current maturity score, as seen in FIG. 5. The dashboard software 225 may select data records for each function (possibly executing a remote procedure call to API 220) selecting all functions within the framework associated with each of the categories, and render a function group label or other indicator (e.g., IDENTIFY (ID), PROTECT (PR), DETECT (DE), RESPOND (RS), RECOVER (RC) in FIG. 5). For each function group indicator, the dashboard software 225 may break out the various functions by category, create a row for each category score, render a background in a heat map color associated with an average maturity score for that category, and insert the category name and maturity score within that row. This process may be repeated for each function and its associated categories, as seen in FIG. 5. The dashboard software 225 may then transmit the report to client 120 for display.

Turning now to FIG. 6, the disclosed software modules may present data to reflect a forecast of the system's readiness at a future date. Thus, using a future date selected by a user through a GUI, the dashboard software 225 may generate a report presenting the forecast maturity data within a dashboard, based on the input data for all projects/assessment objectives, as that seen in FIG. 6.

The organization wishing to determine their forecast maturity score may be authenticated to the dashboard software 225, possibly using a username and password within the organization profile stored in association with the org id.

Once authenticated, in order to determine the organization's forecast maturity score, dashboard software 225 may require a forecast date to determine the organization's maturity score on that date. Thus, dashboard software 225 may render a GUI such as that seen in FIG. 6, including a GUI control for receiving the forecast report date desired by the organization to determine the organization's maturity score on that date, and dashboard software 225 may receive the data from submission of the GUI.

Dashboard software 225 may then execute a database query (possibly executing a remote procedure call to API 220) selecting all data records associated with the authenticated org id and including the data for future projects and/or assessment objectives. Dashboard software 225 may then select data records for each category (possibly executing a remote procedure call to API 220) selecting all categories within the framework associated with each of the assessment objectives. Dashboard software 225 may then group each of the selected data records according to the category associated with the assessment objective in the data record.

Dashboard software 225 may then identify, within each project/assessment objective data record, a data field including a forecast date closest in time to the input forecast report date. Using the forecast date closest to the input forecast report date, dashboard software 225 may select the forecast maturity score associated in the database with the forecast date, and calculate an average of the maturity scores for all assessment objectives associated in the database with that category. This process may be repeated for each of the categories identified within the framework that are associated with the selected assessment objectives.

The dashboard software 225 may then generate and render a GUI for reporting the results of the forecast maturity score, as seen in FIG. 6. The dashboard software 225 may select data records for each function (possibly executing a remote procedure call to API 220) selecting all functions within the framework associated with each of the categories, and then render a function group label or other indicator (e.g., IDENTIFY (ID), PROTECT (PR), DETECT (DE), RESPOND (RS), RECOVER (RC) in FIG. 6).

For each function group indicator, the dashboard software may break out the various functions by category, create a row for each category score, rendering a background in a heat map color associated with an average maturity score for that category, and insert the category name and maturity score within that row. This process may be repeated for each function and its associated categories, as seen in FIG. 6. The dashboard software 225 may then transmit the report to client 120 for display.

Figure 7:
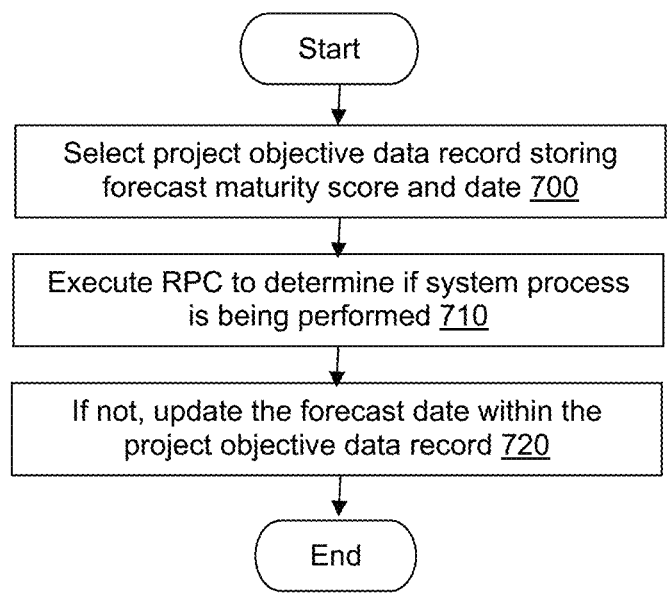
FIG. 7 illustrates a flow diagram for configuring and operating a cybersecurity maturity forecasting tool.

FIG. 7 demonstrates a flow diagram for a non-limiting example of the disclosed embodiments. This embodiment includes a system comprising a server hardware computing device, coupled to a network and comprising at least one processor executing specific computer-executable instructions within a memory. In Step 700, the instructions are executed, causing the system to execute a first database query selecting a project objective data record storing a forecast maturity score and a forecast date earlier in time than a current date, wherein: the forecast maturity score defines a level of compliance with a cybersecurity framework; and the forecast date identifies a date by which an organization will achieve the level of compliance;

In Step 710, the instructions execute a remote procedure call to determine whether a system process is performing a project objective defined within the project objective data record; and In step 720, responsive to a determination that the system process is not performing the project objective, the instructions execute a second database query updating the forecast date within the project objective data record Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:

a server, a custom-designed special-purpose hardware computing device coupled to a network and at least one processor executing specific computer-executable instructions comprising a specific device logic within a memory that, when executed, cause the system to: extract, from an electronic assessment document, at least one assessment data comprising an original maturity score defining an original level of compliance with a cybersecurity framework; analyze a first input into a graphical user interface (GUI) on a client hardware computing device, the first input comprising: a forecast maturity score representing a desired level of compliance with the cybersecurity framework; a forecast date identifying a target date by which an organization, identified by an authenticated organization identifier, will achieve a level of compliance represented by the forecast maturity score;

automatically generate, using a combination of the cybersecurity framework, the original maturity score, the forecast maturity score, and the forecast date: at least one project objective to achieve the forecast maturity score; a project objective forecast date by which the at least one project objective will be completed;

automatically update the at least one project objective responsive to at least one update in the cybersecurity framework;

programmatically audit the system for security weaknesses by executing a remote procedure call to determine whether a system process is performing the at least one project objective, or is configured to complete the at least one project objective prior to or subsequent to the project objective forecast date: and responsive to a determination that the system process is configured to complete the at least one project objective prior to or subsequent to the project objective forecast date:

update the project objective forecast date thereby dynamically updating the forecast date and generate a notification to a project manager of the at least one project objective that the system process is configured to complete the at least one project objective prior to or subsequent to the project objective forecast date.

2. The system of claim 1, wherein the at least one project objective comprises determining whether the system process enforces at least one approved authorization for:

a logical access to at least one information and system resource in accordance with at least one applicable access control policy; or a flow of information within the system and between one or more interconnected systems based on at least one organization-defined policy.

3. The system of claim 1, wherein the at least one project objective comprises determining whether the system process protects against or limits the effects of at least one organization-defined type of denial of service attack by employing at least one organization-defined security safeguard.

4. The system of claim 1, wherein the at least one project objective comprises determining whether the system process:

monitors and controls at least one communication at an external boundary of the system and at least one key internal boundary within the system;

implements at least one subnetwork for at least one publicly accessible system component that is physically or logically separated from at least one internal organizational network; and connects to at least one external network or information system only through at least one managed interface consisting of a plurality of boundary protection devices arranged in accordance with an organizational security architecture.

5. The system of claim 1, wherein the at least one project objective comprises determining whether the system process generates at least one audit record containing information that establishes a type of an event, when the event occurred, where the event occurred, a source of the event, an outcome of the event, and an identity of any individuals or subjects associated with the event.

6. The system of claim 1, wherein the at least one project objective comprises determining whether the system process performs an audit of at least one software update required to overcome a detected security weakness within the system.

7. The system of claim 1, wherein the instructions cause the system to:

decode, from a graphical user interface (GUI), an input identifying a forecast report date subsequent to a current date;

execute a database query identifying, within a project objective data record, the forecast maturity score associated in the database with the forecast date closest in time to a forecast report date;

display, on the GUI, the at least one project objective, and the forecast maturity score for the at least one project objective.

8. The system of claim 7, wherein the instructions cause the system to:

execute an additional database query identifying, within the project objective data record, an actual maturity score associated in the database with an actual date closest in time to the current date;

display, on the GUI, the at least one project objective, and a current maturity score for the at least one project objective.

9. The system of claim 8, wherein the instructions cause the system to display, on the GUI, the at least one project objective, and an assessment maturity score for the at least one project objective derived from an organization assessment of the level of compliance of the organization.

10. A method, comprising:

extracting, by a server, comprising a custom designed special-purpose hardware computing device coupled to a network and comprising at least one processor executing specific computer-executable instructions comprising a specific device logic within a memory, from an electronic assessment document, at least one assessment data comprising an original maturity score defining an original level of compliance with a cybersecurity framework;

analyzing, by the server, a first input into a graphical user interface (GUI) on a client hardware computing device, the first input comprising:

a forecast maturity score representing a desired level of compliance with the cybersecurity framework;

a forecast date identifying a target date by which an organization, identified by an authenticated organization identifier, will achieve a level of compliance represented by the forecast maturity score;

automatically generating, by the server using a combination of the cybersecurity framework, the original maturity score, the forecast maturity score, and the forecast date:

at least one project objective to achieve the forecast maturity score;

a project objective forecast date by which the at least one project objective will be completed;

automatically updating, by the server, the at least one project objective responsive to at least one update in the cybersecurity framework;

programmatically audit the system for security weaknesses by executing, by the server, a remote procedure call to determine whether a system process is performing the at least one project objective, or is configured to complete the at least one project objective prior to or subsequent to the project objective forecast date; and responsive to a determination that the system process is configured to complete the at least one project objective prior to or subsequent to the project objective forecast date:

updating, by the server, the project objective forecast date thereby dynamically updating the forecast date; and generating, by the server, a notification to a project manager of the at least one project objective that the system process is configured to complete the at least one project objective prior to or subsequent to the project objective forecast date.

11. The method of claim 10, further comprising the step of determining, by the server, whether the system process enforces at least one approved authorization for:

a logical access to at least one information and system resource in accordance with at least one applicable access control policy; or a flow of information within the system and between one or more interconnected systems based on at least one organization-defined policy.

12. The method of claim 10, further comprising the step of determining, by the server hardware computing device, whether the system process protects against or limits the effects of at least one organization-defined type of denial of service attack by employing at least one organization-defined security safeguard.

13. The method of claim 10, further comprising the step of determining, by the server, whether the system process:

monitors and controls at least one communication at an external boundary of the system and at least one key internal boundary within the system;

implements at least one subnetwork for at least one publicly accessible system component that is physically or logically separated from at least one internal organizational network; and connects to at least one external network or information system only through at least one managed interface consisting of a plurality of boundary protection devices arranged in accordance with an organizational security architecture.

14. The method of claim 10, further comprising the step of determining, by the server, whether the system process generates at least one audit record containing information that establishes a type of an event, when the event occurred, where the event occurred, a source of the event, an outcome of the event, and an identity of any individuals or subjects associated with the event.

15. The method of claim 10, further comprising the step of determining, by the server, whether the system process performs an audit of at least one software update required to overcome a detected security weakness within the system.

16. The method of claim 10, further comprising the steps of:

decoding, by the server, from a graphical user interface (GUI), an input identifying a forecast report date subsequent to a current date;

executing, by the server, a database query identifying, within a project objective data record, the forecast maturity score associated in the database with the forecast date closest in time to a forecast report date;

displaying, by the server, on the GUI, the at least one project objective, and the forecast maturity score for the at least one project objective.

17. The method of claim 16, further comprising the steps of:

executing, by the server, an additional database query identifying, within the project objective data record, an actual maturity score associated in the database with an actual date closest in time to the current date;

displaying, by the server, on the GUI, the at least one project objective, and a current maturity score for the at least one project objective.

18. The method of claim 17, further comprising the steps of displaying, by the server hardware computing device, on the GUI, the at least one project objective, and an assessment maturity score for the at least one project objective derived from an organization assessment of the level of compliance of the organization.

* * * * *